March 23, 1926.
B. O. EDGERTON
1,577,699
AIR CONTROL FOR VEHICLE RADIATORS
Filed April 29, 1924
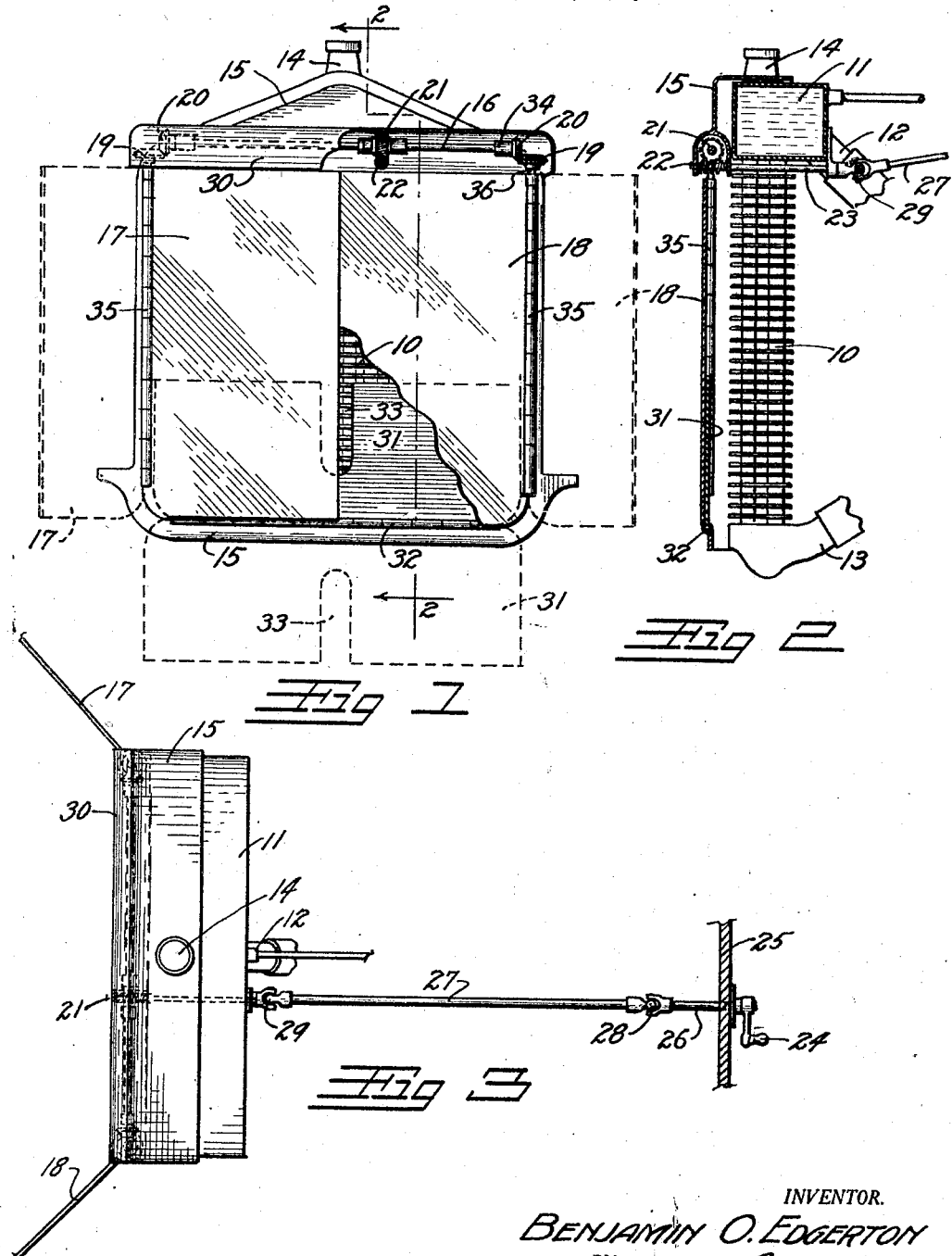
INVENTOR.
BENJAMIN O. EDGERTON
BY
P. H. Galbreath
ATTORNEY.

Patented Mar. 23, 1926.

1,577,699

UNITED STATES PATENT OFFICE.

BENJAMIN O. EDGERTON, OF DENVER, COLORADO.

AIR CONTROL FOR VEHICLE RADIATORS.

Application filed April 29, 1924. Serial No. 709,812.

*To all whom it may concern:*

Be it known that I, BENJAMIN O. EDGERTON, a citizen of the United States of America, residing at Denver, in the county of Denver and State of Colorado, have invented certain new and useful Improvements in Air Controls for Vehicle Radiators, of which the following is a specification.

This invention relates to devices for controlling the amount of air passing through the radiator of an automobile and has for its principal object the provision of an air control which can be used to reduce or increase the amount of air flowing through the radiator below or above the normal amount.

On certain types of automobiles, there is not sufficient radiation surface in the radiator to keep the water therein below the boiling point, during very hot weather or when the engine is pulling heavy loads. In order to increase the cooling capacity of such a radiator, without it being necessary to increase the radiation surface, this device was conceived.

Another object of the invention is to provide an efficient dash or instrument board operating mechanism for an air control device.

A further object of the invention is to provide a winter flap for the radiator which can be used to reduce the active surface thereof during the winter months.

Other objects and advantages reside in the detail construction of the invention, which result in simplicity, economy, and efficiency, and which will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front elevation of a radiator with the invention applied.

Fig. 2 is a vertical cross-section through the same taken on the line 2—2, Fig. 1.

Fig. 3 is a plan view of the radiator as illustrated in Fig. 1, showing how the control is operated from the instrument board of the automobile.

Let the numeral 10, designate one of the usual types of automobile radiators; the numeral 11, the reservoir thereof; the numeral 12, the water intake pipe; the numeral 13, the water outlet pipe; and the numeral 14, the radiator filling nipple.

In applying the invention a special radiator shell 15 is employed which completely surrounds the radiator 10 and fits around the radiator filling nipple 14. Across the shell 15, above the radiator opening, a cross shaft 16 is journaled, as shown at 34. Vertically hinged to each side of the shell 15, as shown at 35 are doors 17 and 18, the hinge pins 36, of which terminate at their upper extremities in bevel gears 19 which mesh with bevel gears 20 secured to the extremities of the cross shaft 16.

A worm gear 21 is secured to the cross shaft 16, intermediate its extremities, which meshes with a worm 22. The worm 22 is carried on a short shaft 23 which extends through the radiator, between the tubes and fins thereof, directly under the reservoir 11.

A suitable housing 30 is provided to enclose the operating mechanism on the shell 15.

A crank or other operating device 24 is mounted on the instrument board of the automobile, which is indicated at 25. The crank 24 rotates an operating shaft 26 which in turn rotates a connecting shaft 27, through the medium of a universal joint 28. The shaft 27 is operatively connected to the shaft 23 by means of a second universal joint 29. It can be readily seen that when the crank 24 is rotated it will operate the worm 22 which, through the medium of the worm wheel 21, will rotate the cross shaft 16 and open or close the gates 17 and 18 as desired.

The applicant is aware that louvers operated from the instrument board have been employed to reduce the amount of air flowing through the radiator but the applicant is not aware that any means have ever been used for increasing the amount of air. The present invention will accomplish the latter, since the gates 17 and 18 can be opened so as to extend beyond each side of the radiator, as illustrated in Fig. 3, forming a funnel-shaped passage for the air which serves to gather the air from a larger area than that of the radiator and force it therethrough.

A horizontal flap 31 is hinged at the bottom of the radiator opening on the housing 15, as shown at 32, and which will be herein designated as the winter flap. This flap is not operated from the operating mechanism previously described. It serves, when turned upward and closed over the radiator 10 as illustrated in Fig. 1, to decrease the radiation area of the radiator and is used in this position during the winter months. In warmer weather, it is turned downward to the broken line position of Fig. 1, allowing the full surface of the radiator 10 to come into action. The winter flap 31 may be provided with a slot 33 to allow it to pass over the crank shaft of certain automobiles.

The universal joints 28 and 29 allow the control crank 24 to be placed at the most convenient point on the instrument board 25 so as not to interfere with present equipment.

The worm gear allows very minute adjustment to be made in the angle of the gates so that the volume of air can be very closely regulated. It also serves to prevent the wind pressure on the gates from operating them, since it is a well known principle that a low pitch worm gear is practically irreversible. It will be noted that, the winter flap 31 folds inside of the gates 17 and 18 so as not to interfere with their operation.

While a specific form of the improvement has been described and illustrated herein, it is desired and understood that the same may be varied, within the scope of the appended claims, without departing from the spirit of the invention.

Having thus described the invention, what I claim and desire secured by Letters Patent is:—

1. An air control device for vehicle radiators comprising hinged doors arranged to completely close the radiator when in the closed position and to extend beyond the sides of the radiator when in the open position so as to direct air therethrough.

2. An air control device for vehicle radiators comprising two hinged doors arranged to completely close the radiator when in the closed position and to extend beyond the sides of the radiator when in the open position so as to direct air therethrough; a cross shaft operatively connected to simultaneously operate said doors and a longitudinal shaft operatively connected to said cross shaft and terminating in an operating handle.

3. An air control device for vehicle radiators comprising a shell adapted to fit over and around said radiator; vertically hinged doors at each side of said radiator; a horizontal housing extending across said radiator above said doors; a horizontal shaft contained within said housing and operatively connected to said doors and means for operating said shaft from the driver's position in said vehicle.

4. An air control device for vehicle radiators comprising a shell adapted to fit over and around said radiator; vertical shafts at each side of said shell; doors secured to said shafts; a horizontal shaft; bevel gears connecting said horizontal shaft with said vertical shafts and means for operating said horizontal shaft from the driver's position in said vehicle.

In testimony whereof, I affix my signature.

BENJAMIN O. EDGERTON.